(12) United States Patent
Kotani

(10) Patent No.: US 8,511,830 B2
(45) Date of Patent: Aug. 20, 2013

(54) PROJECTION SYSTEM, CONTROL METHOD FOR PROJECTION SYSTEM, AND PROJECTION APPARATUS

(75) Inventor: Junji Kotani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 13/036,181

(22) Filed: Feb. 28, 2011

(65) Prior Publication Data
US 2011/0242493 A1    Oct. 6, 2011

(30) Foreign Application Priority Data
Apr. 1, 2010   (JP) .................. 2010-085234

(51) Int. Cl.
*G03B 21/26*   (2006.01)
*G06K 9/34*    (2006.01)
*H04N 9/74*    (2006.01)

(52) U.S. Cl.
USPC ............... 353/30; 353/94; 353/121; 382/174; 348/584; 348/721

(58) Field of Classification Search
USPC ............. 353/30, 94, 121; 382/174; 348/584, 348/721
See application file for complete search history.

(56) References Cited

U.S. PATENT DOCUMENTS

| 7,014,323 | B2 | 3/2006 | Kobayashi et al. |
| 8,123,360 | B2 * | 2/2012 | Hasegawa ................ 353/30 |
| 2004/0227908 | A1 * | 11/2004 | Wada et al. .............. 353/94 |
| 2007/0058140 | A1 * | 3/2007 | Kobayashi et al. ....... 353/94 |
| 2008/0143969 | A1 * | 6/2008 | Aufranc et al. ........... 353/30 |
| 2008/0259223 | A1 * | 10/2008 | Read et al. ............... 348/745 |
| 2010/0128228 | A1 * | 5/2010 | Matsuo et al. ........... 353/34 |

FOREIGN PATENT DOCUMENTS

| JP | 2004-274354 | 9/2004 |
| JP | 2008-061160 | 3/2008 |

* cited by examiner

*Primary Examiner* — Georgia Y Epps
*Assistant Examiner* — Magda Cruz
(74) *Attorney, Agent, or Firm* — Cowan, Liebowitz & Latman, P.C.

(57) ABSTRACT

The focus position of each projection apparatus is changed depending on the configuration state of a projection system comprising a plurality of projection apparatuses.

14 Claims, 9 Drawing Sheets

F I G. 5A
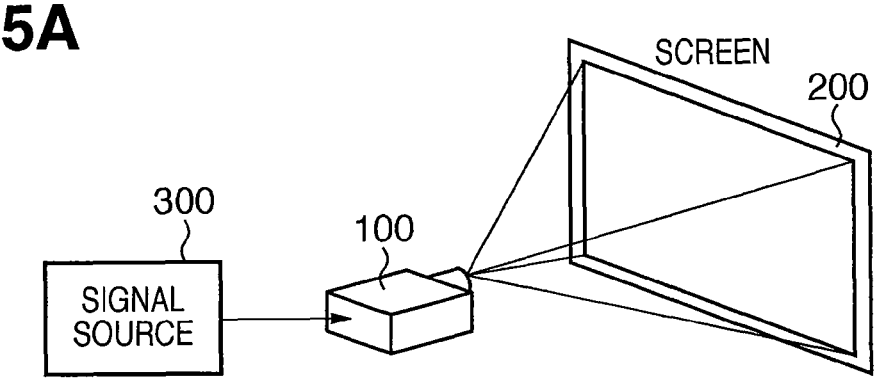
F I G. 5B
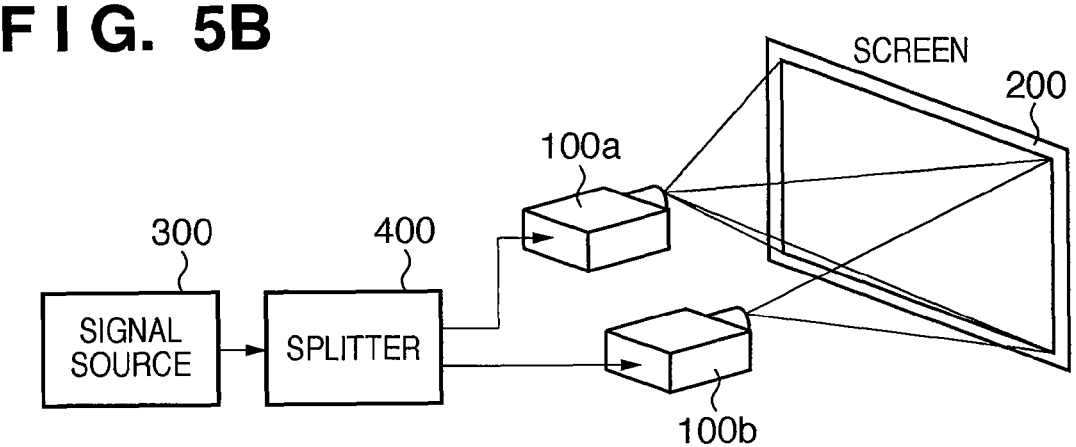
F I G. 5C
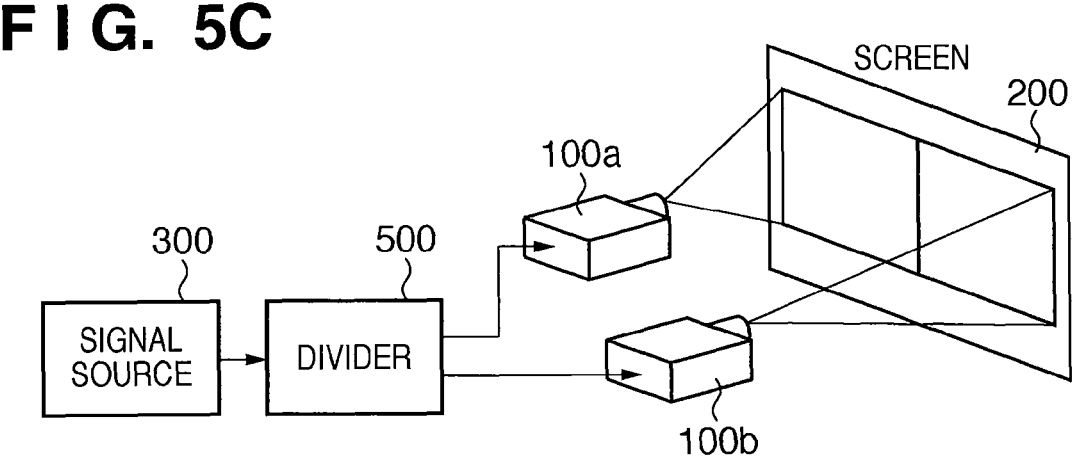

F I G. 12

| PATTERN | FOCUS LENS DRIVING AMOUNT | | | | | | | | |
|---|---|---|---|---|---|---|---|---|---|
| | A | B | C | D | E | F | G | H | I |
| (1) 1.0 m, TELEPHOTO END | $A_1$ | $B_1$ | $C_1$ | $D_1$ | $E_1$ | $F_1$ | $G_1$ | $H_1$ | $I_1$ |
| (2) 1.0 m, WIDE ANGLE END | $A_2$ | $B_2$ | $C_2$ | $D_2$ | $E_2$ | $F_2$ | $G_2$ | $H_2$ | $I_2$ |
| (3) INFINITE DISTANCE, TELEPHOTO END | $A_3$ | $B_3$ | $C_3$ | $D_3$ | $E_3$ | $F_3$ | $G_3$ | $H_3$ | $I_3$ |
| (4) INFINITE DISTANCE, WIDE ANGLE END | $A_4$ | $B_4$ | $C_4$ | $D_4$ | $E_4$ | $F_4$ | $G_4$ | $H_4$ | $I_4$ |

PROJECTION SYSTEM, CONTROL METHOD FOR PROJECTION SYSTEM, AND PROJECTION APPARATUS

BACKGROUND OF THE INVENTION

1. Field of the Invention

The present invention relates to a projection system in which a large image is projected and displayed using a combination of a plurality of devices, a control method for the projection system, and a projection apparatus.

2. Description of the Related Art

Conventionally, a projector that projects an image generated by a light valve such as a liquid crystal panel onto a screen is known as a projection apparatus. Since the distance between the projector and the screen is generally arbitrary, the projector needs a function of focusing on the screen at arbitrary distances.

Methods for focusing include a manual focusing method and an automatic focusing method. In the manual focusing method, while looking at a projected image on the screen, a user manually adjusts a focus adjustment mechanism provided in a projection optical system, and sets the mechanism at the position where sharpness of the image on the screen is high. This method imposes a heavy burden on the user.

Japanese Patent Laid-Open No. 2004-274354 discloses an automatic focusing method. Specifically, the focal length is changed while projecting an image onto a screen from a projector, and the image projected during that change period is captured to thereby detect the focal length to the center of an image projection region. Then, a projection optical system is controlled so as to have the detected focal length. Normally, the center portion of an image is considered to be the most important, and thus it is often desirable to focus in the center of a projection picture plane.

Further, Japanese Patent Laid-Open No. 2008-061160 discloses multi-projection that realizes projection of a large picture plane using a plurality of projectors.

For example, in multi-projection in which two projectors are horizontally arranged, and the projectors are respectively caused to project a right half and a left half of one picture plane, the horizontal length of a picture plane can be increased two-fold by horizontally arranging the projected images on a screen. FIG. 2 shows examples of projection picture planes. Reference numeral 200 denotes a screen serving as a projection plane. Reference numeral 201 denotes a projection picture plane projected by a first projector (not shown). Reference numeral 202 denotes a projection picture plane projected by a second projector (not shown). In FIG. 2, the two projection picture planes 201 and 202 constitute a single multi-projection picture plane.

The conventional projectors focus at the center position of the respective projected images. Accordingly, in the example shown in FIG. 2, the projector that projects the projection picture plane 201 focuses at a center position 203 of the projection picture plane 201, in the case of using the autofocus method. Similarly, the projector that projects the projection picture plane 202 focuses at a center position 204 of the projection picture plane 202, in the case of using the autofocus method.

However, in multi-projection, a single picture plane is constituted by a plurality of projected images, and it is preferable to focus at a center position 205 of the entire picture plane.

SUMMARY OF THE INVENTION

The present invention has been conceived in order to satisfy such demands, and presents a projection system that enables focus adjustment suitable for each of single projection and multi-projection, a control method for the projection system, and a projection apparatus.

According to an aspect of the present invention, there is provided a projection system comprising a first projection apparatus and a second projection apparatus, the first projection apparatus including: a first projection unit configured to project an image onto a projection plane; and a first optical control unit configured to control an optical system such that an image, that is positioned at a designated first specific position of the image projected by the first projection unit, is sharply displayed on the projection plane, the second projection apparatus including: a second projection unit configured to project an image onto a projection plane; and a second optical control unit configured to control an optical system such that an image, that is positioned at a designated second specific position of the image projected by the second projection unit, is sharply displayed on the projection plane, and the projection system comprising a control unit configured, if projection is performed in which a projection image projected by the first projection unit and a projection image projected by the second projection unit each form a part of one image: to control the first optical control unit so as to cause the first specific position to be closer to the projection image projected by the second projection unit relative to the center of the projection image projected by the first projection unit; and to control the second optical control unit so as to cause the second specific position to be closer to the projection image projected by the first projection unit relative to the center of the projection image projected by the second projection unit.

According to another aspect of the present invention, there is provided a control method for a projection system comprising (i) a first projection apparatus including a first projection unit configured to project an image onto a projection plane and a first optical control unit configured to control an optical system such that an image, that is positioned at a designated first specific position of the image projected by the first projection unit, is sharply displayed on the projection plane, and (ii) a second projection apparatus including a second projection unit configured to project an image onto a projection plane and a second optical control unit configured to control an optical system such that an image, that is positioned at a designated second specific position of the image projected by the second projection unit, is sharply displayed on the projection plane, the method comprising: a step of, if projection is performed in which a projection image projected by the first projection unit and the projection image projected by the second projection unit each form a part of one image, controlling the first optical control unit so as to cause the first specific position to be closer to the projection image projected by the second projection unit relative to the center of the projection image projected by the first projection unit, and controlling the second optical control unit so as to cause the second specific position to be closer to the projection image projected by the first projection unit relative to the center of the projection image projected by the second projection unit.

According to another aspect of the present invention, there is provided a projection apparatus for projecting an image onto a projection plane, comprising: a projection unit configured to project an image onto a projection plane; an optical control unit configured to control an optical system such that an image, that is positioned at a designated specific position of the image projected by the projection unit, is sharply displayed on the projection plane; and a control unit configured to change the specific position depending on whether projection in which a projection image projected by another projection apparatus and the projection image projected by the projection unit each form a part of one image is performed or whether projection in which the projection unit forms one image is performed.

According to another aspect of the present invention, there is provided a projection system comprising a plurality of projection apparatuses, each of the projection apparatuses including: a projection unit configured to project an image onto a projection plane; and an optical control unit configured to control an optical system such that an image, that is positioned at a designated specific position of the image projected by the projection unit, is sharply displayed on the projection plane, wherein the specific position used by the optical control unit of each of the projection apparatuses is changed depending on whether each of the plurality of projection apparatuses projects a part of one image or whether each of the plurality of projection apparatuses projects one image.

According to the present invention, in the case of multi-projection, since control is performed so as to set a focus position in consideration of a multi-projection picture plane, an appropriate autofocus mechanism can be realized even in the case of multi-projection. Accordingly, in the case of constituting multi-projection, each projector changes a focus position such that focus is set to the center of a multi-projection picture plane, for example. This can increase the sharpness of the center portion of an image, which can be typically considered as the most important portion thereof, for example. In this way, it is possible to realize more appropriate projection for a viewer to view images.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A to 5C show examples of configurations of single projection, stack projection, and multi-projection.

FIG. 12 shows a table for deriving the focus lens driving amount.

DESCRIPTION OF THE EMBODIMENTS

Various exemplary embodiments, features, and aspects of the invention will be described in detail below with reference to the drawings.

First Embodiment

Figure 1:
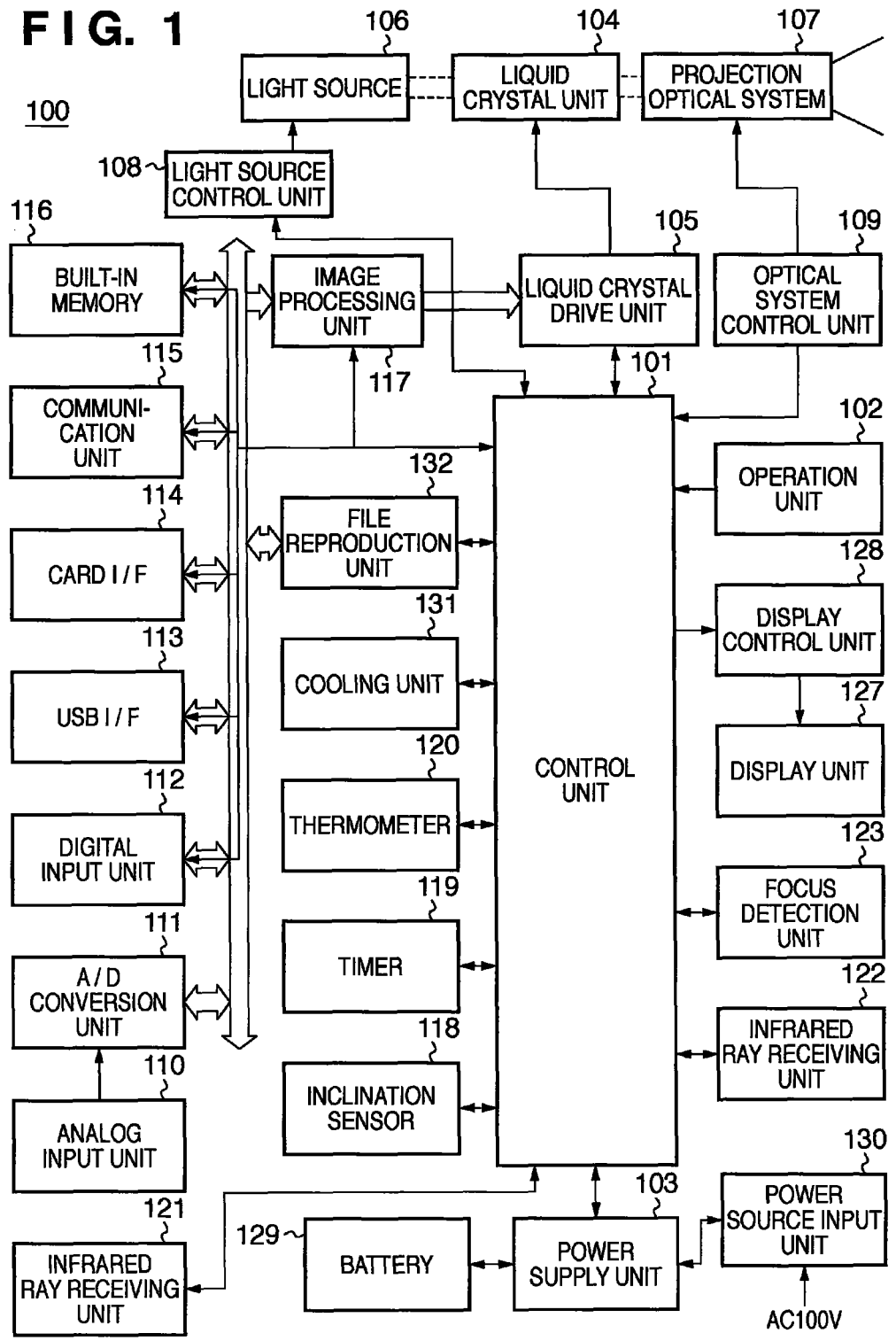
FIG. 1 is a block diagram of a schematic configuration of one embodiment of the present invention.

FIG. 1 shows a block diagram of a schematic configuration of a projection apparatus, which is an embodiment of the present invention. A projection apparatus shown in FIG. 1 is a so-called liquid crystal projector having therein a liquid crystal panel.

Reference numeral 101 denotes a control unit that controls blocks of a projector 100. Reference numeral 102 denotes an operation unit that accepts an operation from a user. Reference numeral 103 denotes a power supply unit that controls power supply to the blocks of the projector 100.

Reference numeral 104 denotes a liquid crystal unit, which is constituted by one or three liquid crystal panels and the like, and forms an image on the liquid crystal panel. Reference numeral 105 denotes a liquid crystal drive unit that causes the liquid crystal panel of the liquid crystal unit 104 to form an image based on an input image signal. Reference numeral 106 denotes a light source that illuminates the liquid crystal unit 104 from a back face thereof. Reference numeral 107 denotes a projection optical system that projects, onto a screen (not shown), an optical image obtained by supplying illumination light from the light source 106 to the liquid crystal unit 104. Reference numeral 108 denotes a light source control unit 108 that controls the amount of light of the light source 106, and the like. Reference numeral 109 denotes an optical system control unit that controls the operation of a zoom lens, a focus lens, and the like of the projection optical system 107, and performs zoom magnification, focus adjustment, and the like.

Reference numeral 110 denotes an analog input unit that accepts an analog video signal from a video source such as a PC (personal computer), a DVD player, or a television tuner, and is provided with an RGB terminal, an S terminal, or the like. Reference numeral 111 denotes an A/D conversion unit that converts an analog video signal from the analog input unit 110 into a digital signal. Reference numeral 112 denotes a digital input unit that accepts a digital video signal from a video source, and is provided with an HDMI terminal or the like. In the case of the HDMI terminal, a control signal may also be simultaneously transmitted from the outside, and video display control and the like may be performed based on the signal. A video signal and an image signal that are input by the digital input unit 112 are directly transmitted to an image processing unit 117.

Reference numeral 113 denotes a USB interface, with which files of various information data such as video data, image data, and video files can be received from an external device, and such files can be written in the external device. A pointing device, a keyboard, a USB type flash memory, or the like may be connected to the USB interface 113.

Reference numeral 114 denotes a card interface for reading/writing files of various information data such as video data, image data, and video files from/in a card type recording medium. Reference numeral 115 denotes a communication unit that transmits and receives files of various information data such as video data, image data, and video files, and other command signals via an intranet or the Internet. The communication unit 115 is constituted by, for example, a wired LAN, a wireless LAN, or the like. Reference numeral 116 denotes a built-in memory that stores files of various information data such as video data, image data, and video files, and is constituted by a semiconductor memory, a hard disk, or the like.

For example, a document file input via the card interface 114 is reproduced by a file reproduction unit 132. The file reproduction unit 132 generates, from a document file, an image signal for presentation to a user, and outputs the generated signal to the image processing unit 117.

The image processing unit 117 performs correction suitable for display by the liquid crystal unit 104, on image signals obtained via the interfaces 113 and 114 and the file reproduction unit 132, a video signal obtained by the control unit 101, and the like. For example, correction suitable for image formation by the liquid crystal panel is performed by converting the number of pixels of an image signal in accordance with the number of pixels of the liquid crystal panel, and doubling the number of frames of the input video signal for the alternating current drive of the liquid crystal panel. Incidentally, the alternating current drive of the liquid crystal panel is a method for display by alternately changing the direction of the voltage applied to the liquid crystal of the liquid crystal panel, and is performed utilizing properties of the liquid crystal panel, that is, the property of being able to generate an image even if the direction of the applied voltage to the liquid crystal is a normal direction or an opposite direction. At this time, since it is necessary to send one image each for the normal direction and for the opposite direction to the liquid crystal drive unit 105, the image processing unit 117 performs processing for doubling the number of frames of a video signal. The liquid crystal drive unit 105 causes the liquid crystal panel of the liquid crystal unit 104 to form an image based on an image signal from the image processing unit 117.

In the case where, for example, a projection picture plane is distorted into a trapezoidal shape due to video being projected in an oblique direction relative to a screen, the image processing unit 117 also performs keystone correction, on the projected image, for deforming the shape of an image so as to eliminate trapezoidal distortion. When keystone correction is performed, the magnification/reduction ratio in the horizontal and/or vertical direction of an image displayed on the liquid crystal panel is changed. Specifically, trapezoidal distortion of a projection picture plane is offset using distortion in a video region on the liquid crystal panel. Accordingly, a projection image is displayed on the screen so as to approximate a rectangular video display region having a normal aspect ratio. Keystone correction may be automatically executed based on the inclination angle obtained by an inclination sensor 118 or may be executed by the user operation of the operation unit 102 or the like.

Reference numeral 118 denotes an inclination sensor that detects the inclination of the projector 100. Reference numeral 119 denotes a timer that detects the operating time of the projector 100, the operating time of each block, and the like. Reference numeral 120 denotes a thermometer that measures the temperature of the light source 106 of the projector 100, the temperature of the liquid crystal unit 104, the outdoor temperature, and the like.

Reference numerals 121 and 122 denote infrared ray receiving units that each receive infrared rays from a remote control belonging to the projector 100 and other devices, and send the infrared rays to the control unit 101. The infrared ray receiving units are installed at a plurality of locations in the direction in front of and behind the projector 100, and the like. In the present embodiment, the infrared ray receiving unit 121 is disposed behind the projector main body, and the infrared ray receiving unit 122 is disposed in front of the projector main body.

Reference numeral 123 denotes a focus detection unit that detects the distance between the projector 100 and the screen (not shown), and detects the focal length. The operation of the focus detection unit 123 will be described later.

Reference numeral 127 denotes a display unit that is disposed on the main body of the projector 100, and displays states of the projector 100, warnings, and the like. Reference numeral 128 denotes a display control unit that controls the display unit 127.

Reference numeral 129 denotes a battery that supplies power when the main body of the projector 100 is carried and used. Reference numeral 130 denotes a power source input unit that accepts the alternating current power from the outside, rectifies the current to a predetermined voltage, and supplies the resultant current to the power supply unit 103.

Reference numeral 131 denotes a cooling unit for cooling by releasing the heat in the projector 100 to the outside, and is constituted by a heat sink and a fan, for example.

Now, the operation in the case of using the single projector 100 (single projection operation) is described. The control unit 101 of the projector 100 controls the power supply unit 103 to supply power to each block in response to an instruction to turn the power on from the operation unit 102, and causes the blocks to enter a standby state. After the power is turned on, the control unit 101 instructs the light source control unit 108 to cause the light source 106 to emit light. Next, the control unit 101 instructs the optical system control unit 109 to adjust focus of the projection optical system 107, based on focal distance information obtained by the focus detection unit 123, and the like. The optical system control unit 109 issues an instruction so as to operate the zoom lens and the focus lens of the projection optical system 107 and cause projected light to form an image on the screen picture plane. Details of focus adjustment will be described later. In this way, preparation for projection is completed.

The image processing unit 117 converts a video signal that has been input in the digital input unit 112 so as to have a resolution suitable for the liquid crystal unit 104, and applies thereto gamma correction, correction for a countermeasure against luminance unevenness, and keystone correction. The liquid crystal drive unit 105 causes the liquid crystal panel of the liquid crystal unit 104 to form a corresponding image in accordance with the video signal corrected by the image processing unit 117. The image formed on the liquid crystal panel of the liquid crystal unit 104 is converted into an optical image by the optical modulation of illumination light from the light source 106. This optical image is projected onto the screen (not shown) by the projection optical system 107.

During projection, the control unit 101 detects the temperature of the light source 106 and the like using the thermometer 120, and operates the cooling unit 131 to perform cooling when, for example, the temperature of the light source becomes 40 degrees or more, for instance.

If operation of turning the power off is performed via the operation unit 102, the control unit 101 instructs the blocks to perform end processing. When the end preparation is completed, the power supply unit 103 sequentially stops power supply to the blocks. The cooling unit 131 operates for a while after the power has been turned off, and cools the projector 100.

Although the operation in the case of displaying a video signal input from the digital input unit 112 has been described, the same also applies to the case of displaying video data input from the USB interface 113 or the card interface 114.

In the present embodiment, one or more projectors 100 can constitute the projection system, and a single projector 100 can be used, or a combination of a plurality of projectors can also be used. The latter can realize multi-projection. FIG. 5A shows an example of the most typical configuration of single projection. A video signal that has been output from a signal source (video source) 300 is input in the analog input unit 110 or the digital input unit 112 of the projector 100. The projector 100 projects and displays, on the screen 200, an image based on the video signal from the signal source 300.

FIG. 5B shows an example of a configuration of stack projection. A video signal that has been output from the signal source 300 is input in a splitter 400. The splitter 400 supplies the video signal from the signal source 300 to a projector 100a and a projector 100b. The projectors 100a and 100b have the same configuration as that of the projector 100. The projectors 100a and 100b project and display the same image based on the same video signal at the same position on the screen 200. Accordingly, an image having twice the luminance compared with that in single projection is displayed. Although two projectors are used in this example, three or more projectors may be used.

A configuration may be adopted in which the splitter 400 is incorporated in the projector 100a or 100b. In this case, an equivalent function can be realized by daisy-chaining the wiring of a video signal system between the projectors 100a and 100b.

FIG. 5C shows an example of a configuration of multi-projection. A divider 500 divides a video signal from the signal source 300 into a video signal for a left half and a video signal for a right half, and supplies the signals to the projectors 100a and 100b, respectively. The projectors 100a and 100b respectively project and display an image according to the input video signal at positions on the screen 200 that are adjoining each other. Accordingly, an image having twice the resolution in the horizontal direction is displayed, compared with single projection. Although the two projectors 100a and 100b are horizontally arranged in this example, the projectors may be arranged vertically, or projectors may be arranged 2×2 horizontally and vertically, or other three or more projectors may be used and arranged.

A configuration may be adopted in which the divider 500 is incorporated in the projector 100a or 100b. In this case, an equivalent function can be realized by daisy-chaining the wiring of a video signal system between the projectors 100a and 100b.

The projector 100 can distinguish between single projection, multi-projection, and stack projection, and adjust focus according to each projection type. When performing multi-projection, the projector 100 can distinguish the picture plane that it handles on the screen, specifically, a multi-projection configuration. This function will be described in detail.

Figure 6:
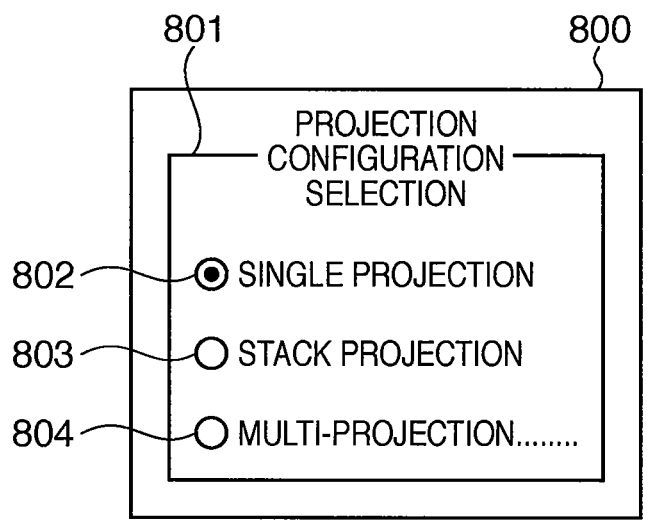
FIG. 6 is an explanatory diagram of a menu for inputting the configuration of a projection system.

If preparation for projection is completed, the projector 100 (100a, 100b) projects and displays a menu 800 as shown in FIG. 6 with respect to the user. In the menu 800, three options 802, 803, and 804 are presented to the user as projection configuration selection 801. Specifically, the options are the option 802 indicating single projection, the option 803 indicating stack projection, and the option 804 indicating multi-projection. In FIG. 6, the option 802 is in a selected state as an example. The user confirms the configuration of the actual projection, and selects one of the options 802 to 804 using the operation unit 102.

Figure 7:
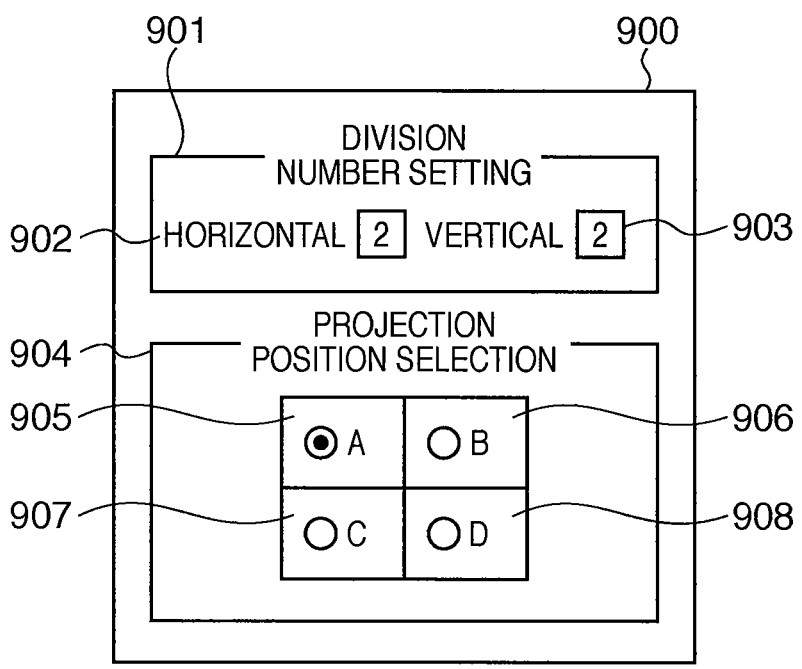
FIG. 7 is an explanatory diagram of a menu for inputting the configuration in the case of multi-projection.

Furthermore, as configuration information, information on the number of projectors in the case of the stack configuration, and information on the number of projectors, arrangement, and allotment in the case of multi-projection are respectively necessary. FIG. 7 shows an example of a menu screen for allowing the user to input further configuration information on multi-projection. A menu 900 shown in FIG. 7 is displayed continuously when the option 804 for multi-projection is selected in the menu 800.

In the menu 900, an input field 902 for the number of horizontal picture planes and an input field 903 for the number of vertical picture planes are provided in division number setting 901 as the picture plane configuration of multi-projection. In FIG. 7, the numeral 2 is input in both of the fields. Furthermore, projection position selection 904 for inputting a position on the multi-projection picture plane allotted to the corresponding projector is provided in the menu 900. In the projection position selection 904, a picture plane configuration obtained by reflecting therein the input values in the division number setting 901 (the number of horizontal picture planes and the number of vertical picture planes) is displayed. Since 2×2 vertical and horizontal picture planes are set in the example shown in FIG. 7, rectangles 905 to 908 divided into four and reflecting this setting are displayed. These rectangles 905 to 908 are options for inputting which picture plane is a picture plane that the corresponding projector handles in the picture plane configuration of multi-projection. The upper left picture plane position is selected in FIG. 7. The user confirms the configuration of the actual projection, inputs the number of divisions in the input fields for the number of picture planes using the operation unit 102, and selects the allotment of the corresponding projector in the projection position selection 904.

The operation using the menus 800 and 900 as described is performed with respect to each of the projectors that constitute the projection system. The projectors can recognize information on the configuration of the projection system.

Although configuration information of the projection system is input in the projectors by the user operating each of the projectors that constitute the projection system, other methods may be used. For example, the user may input configuration information of the projection system in another device (the splitter 400, the divider 500, another control device, or the like), and that device may transmit or set configuration information to/in the projectors.

The projectors that constitute the projection system may automatically distinguish the configuration. For example, each of the projectors projects a distinguishing image for distinguishing the projector itself, thereafter captures the projection region of the projector itself and therearound, and detects the distinguishing image of the projector itself included in the captured image, thereby enabling automatic discrimination of the configuration to be performed.

Figure 8A:
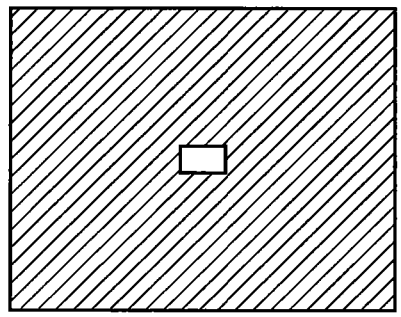
FIGS. 8A to 8D show examples of test patterns.

In the present embodiment, implementation of autofocusing is triggered when autofocus is instructed via the operation unit 102, when input of the projection configuration described above is completed, or the like. An example of a method for autofocus processing is TV AF as described below. Specifically, first, a test pattern having contrast as shown in FIG. 8A is projected. While the optical system control unit 109 is changing the focus lens driving amount with respect to this test pattern, the test pattern is captured by the focus detection unit 123 composed of a line sensor or an area sensor. Accordingly, the relationship between the focus lens driving amount and the sharpness of the image can be obtained. The driving amount that achieves the highest sharpness of the image is obtained, and the focus lens is controlled by the optical system control unit 109, thereby focusing at the position of the test pattern.

Figure 8B:
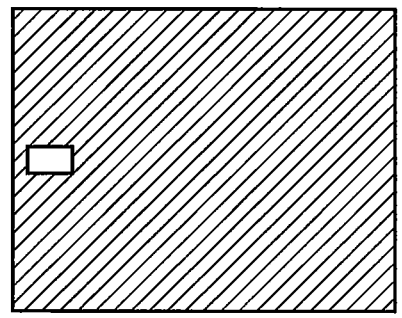
Figure 8C:
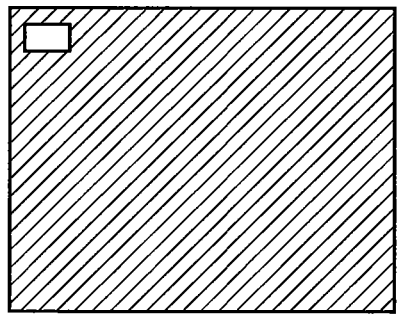

In the case of the test pattern having a high luminosity region in the center as shown in FIG. 8A, it is possible to focus in the center of the picture plane. In the case of a test pattern having a high luminosity region on the left side of the picture plane as shown in FIG. 8B, it is possible to focus on the left side of the picture plane. In the case of a test pattern having a high luminosity region at the upper left of the picture plane as shown in FIG. 8C, it is possible to focus at the upper left of the picture plane. In the case of a test pattern having high luminosity regions equally distributed in the picture plane as shown in FIG. 8D, it is possible to focus in an average manner on the entire picture plane.

Figure 8D:
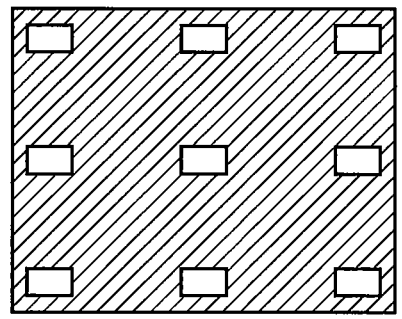

Regardless of the projection configuration, a test pattern that enables detection of contrast at any picture plane position as shown in FIG. 8D may be projected. In this case, in accordance with the projection configuration and the picture plane position that a projector handles in the case of multi-projection, the region where focus is to be detected is controlled as described with reference to FIGS. 8A to 8C. Accordingly, a result similar to that described above can be obtained.

Figure 9:
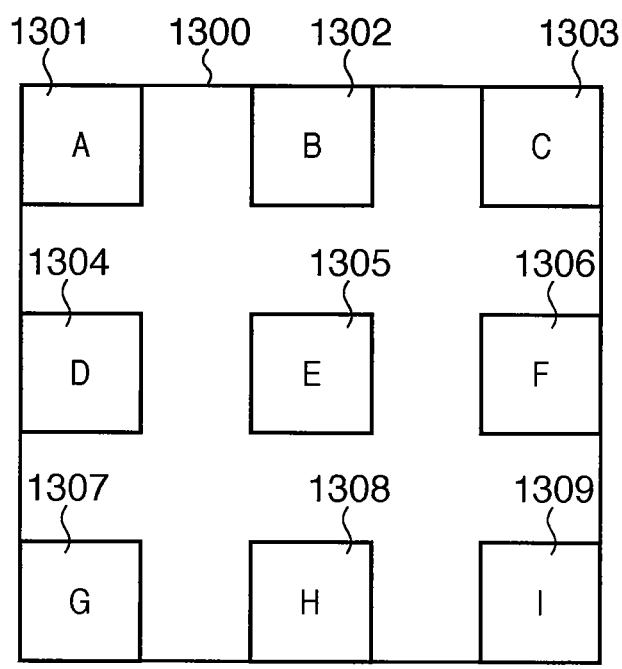
FIG. 9 is an explanatory diagram of focus positions.

Now, an example of an appropriate focus position of the projectors that constitute multi-projection is described. FIG. 9 is an explanatory diagram of focus positions on a projection plane. Reference numeral 1300 denotes a projection picture plane projected by a projector of interest. Reference numerals 1301 to 1309 respectively denote focus positions A to I. In the case of single projection or stack projection, since it is normally desirable that focus is set to the center of the picture plane in many cases, focus adjustment is performed such that sharpness is the highest at the position E.

However, in multi-projection, a case where it is appropriate to focus at another position is a typical case, as describes below.

Figure 2:
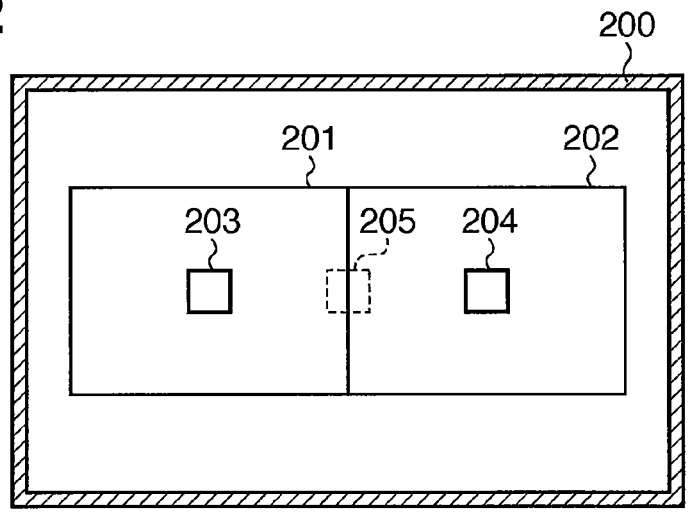
FIG. 2 is an explanatory diagram of multi-projection using two horizontal picture planes.

Now, the case of multi-projection in which two picture planes are horizontally arranged as shown in FIG. 2 is described. If such a case is handled as single projection, typically focuses are respectively set at the center positions 203 and 204 on the picture planes that projectors handle. However, in the case of multi-projection, it is desirable to focus in the center 205 on the multi-projection picture plane. Accordingly, it is preferable that the projector handling the picture plane 201 on the left side focuses such that sharpness is the highest at the position F shown in FIG. 9. On the other hand, it is preferable that the projector handling the picture plane 202 on the right side focuses such that sharpness is the highest at the position D shown in FIG. 9.

Figure 3:
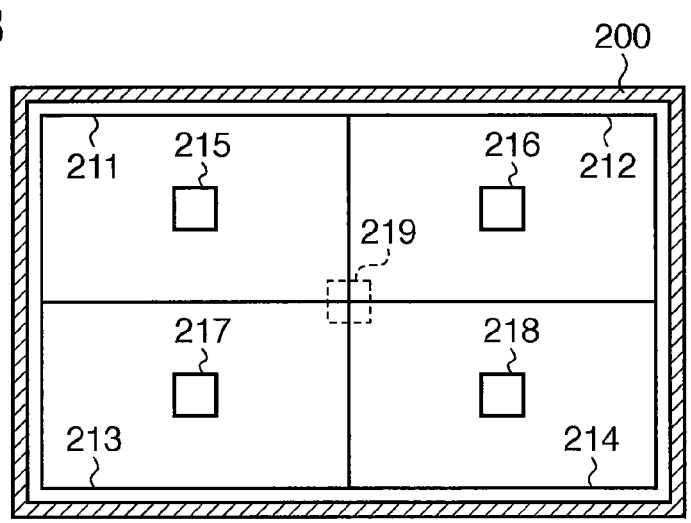
FIG. 3 is an explanatory diagram of multi-projection using 2×2 vertical and horizontal picture planes.

The case of multi-projection constituted by vertical and horizontal 2×2 picture planes as shown in FIG. 3 will be as follows. In FIG. 3, reference numerals 211 to 214 respectively denote upper left, upper right, lower left, and lower right partial picture planes. Reference numerals 215 to 218 denote the center of the partial picture planes 211 to 214. In multi-projection, video is displayed using one picture plane having an integration of the partial picture planes 211 to 214. Reference numeral 219 denotes the center position of multi-projection in this example. With regard to the partial picture planes 211 to 214, if this case is handled as single projection, typically focus is set to the respective centers 215 to 218 of the partial picture planes 211 to 214. In contrast, the desirable focus position in multi-projection is the center position 219. Accordingly, it is preferable that the projectors handling the upper left, upper right, lower left, and lower right partial picture planes 211 to 214 respectively focus such that sharpness is the highest at the positions I, G, C, and A shown in FIG. 9.

Figure 4:
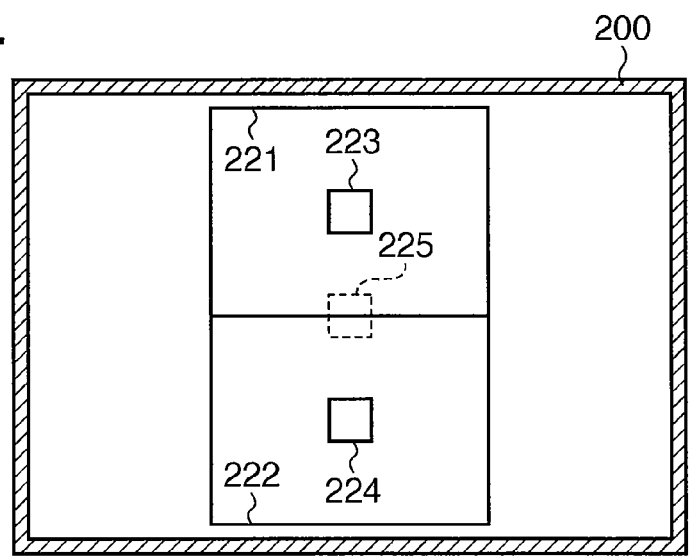
FIG. 4 is an explanatory diagram of multi-projection using two vertical picture planes.

As a third example, the case of multi-projection in which two picture planes are vertically arranged as shown in FIG. 4 will be as follows. In FIG. 4, reference numerals 221 and 222 respectively denote upper and lower partial picture planes. Since this example shows multi-projection, video is displayed using one picture plane having an integration of the partial picture planes 221 and 222. Reference numerals 223 and 224 denote the center of the partial picture planes 221 and 222. Reference numeral 225 denotes the center position of multi-projection in this example.

With regard to the partial picture planes 221 and 222, if this case is handled as single projection, typically focus is set to the respective centers 223 and 224 of the partial picture planes 221 and 222. On the other hand, the desirable focus position on the projection plane in multi-projection is a center position 225. Accordingly, it is preferable that projectors handling the upper and lower partial picture planes 221 and 222 respectively focus such that sharpness is the highest at the positions H and B shown in FIG. 9. Specifically, as described with reference to FIGS. 2 to 4, in the case of multi-projection for projecting a single image using a plurality of projectors, it is preferable to set a focus position at a position where images that the projectors handle are joined. Specifically, in the case of multi-projection, rather than respectively focusing in the center of the images that the projectors handle, it is preferable to change the respective focus positions in the center direction of the image to be displayed using the respective projectors.

Figure 10:
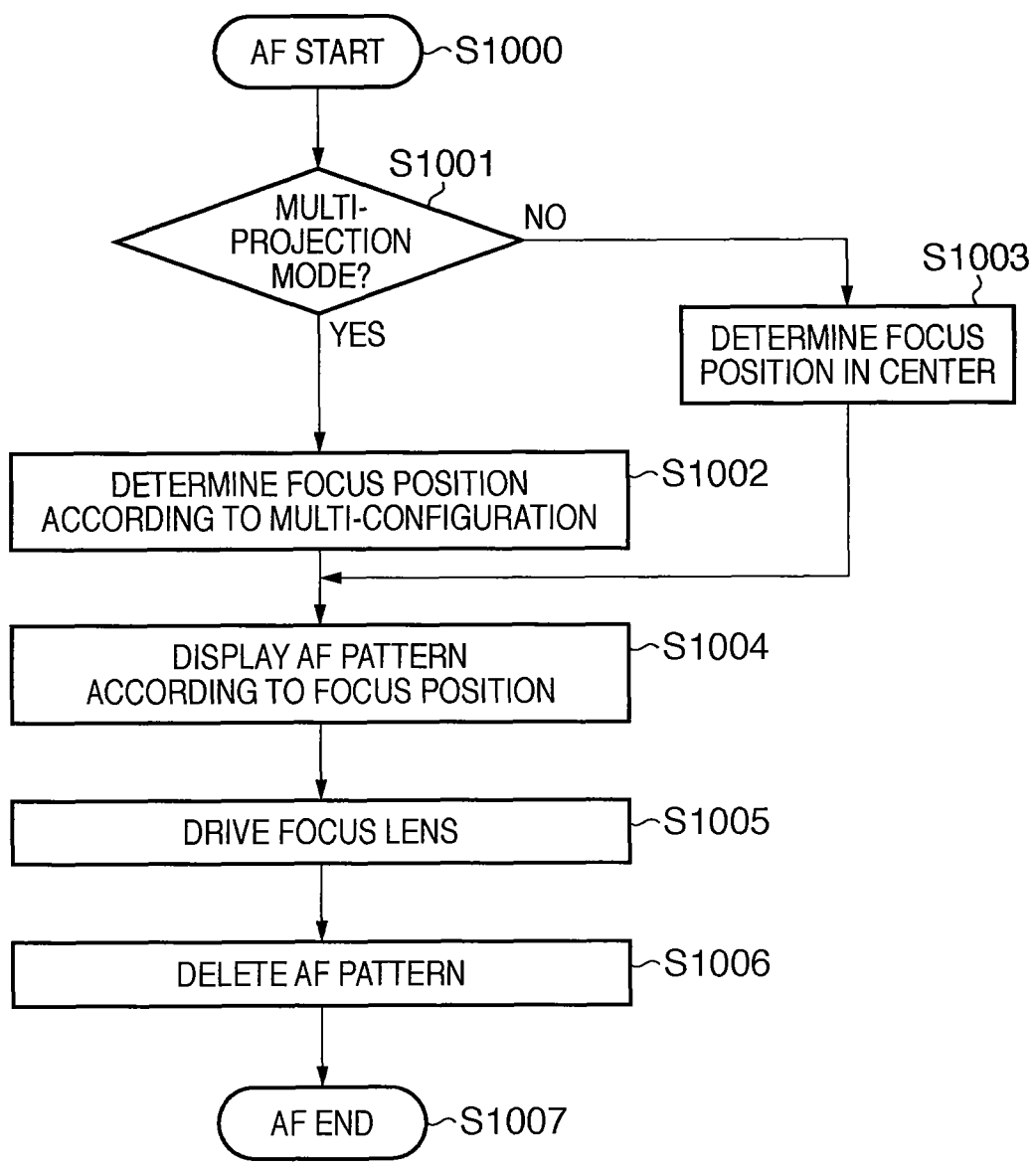
FIG. 10 is a flowchart of an autofocus operation in a first embodiment.

FIG. 10 shows a flow for controlling a focus position in accordance with projection configurations such as single projection, multi-projection, and stack projection. The control unit 101 of each projector adjusts focus in accordance with the flow shown in FIG. 10.

The flow starts in step S1000.

In step S1001, it is determined whether or not the projection configuration is multi-projection. The processing branches to step S1002 if it is multi-projection, and the processing branches to step S1003 if it is not.

In step S1002, a focus position suitable for the multi-configuration is determined. Specifically, one of the positions A to I shown in FIG. 9 is selected using the method described above such that focus is set to the center portion of the multi-configuration.

In step S1003, the center of the picture plane (position E in FIG. 9) is determined as a focus position suitable for single projection or stack projection.

After step S1002 or step S1003, an AF pattern according to the determined focus position is displayed in step S1004. For example, since focus is set to the center of the picture plane (position E in FIG. 9) using TV AF in single projection or stack projection, a pattern having contrast in the center of the picture plane as shown in FIG. 8A is displayed. The projector handling the picture plane 202 on the right side in multi-projection in which two picture planes are horizontally arranged as shown in FIG. 2 displays a test pattern as shown in FIG. 8B corresponding to the position D shown in FIG. 9. The projector handling the picture plane 201 on the left side displays a test pattern obtained by laterally reversing the test pattern shown in FIG. 8B, which corresponds to the position F shown in FIG. 9. Further, in the case of a projector handling the lower right of the 2×2 multi-configuration, the projector displays a test pattern as shown in FIG. 8C corresponding to the position A shown in FIG. 9.

In step S1005, the focus lens is driven based on TV AF such that focus is set at the location of the test pattern displayed in step S1004. Accordingly, focus can be set at the position determined in step S1002 or step S1003.

In step S1006, the test pattern displayed for AF is deleted, and the display returns to the display of original video.

In step S1007, the flow of autofocus ends.

As another method for determining a focus position, a single test pattern may be displayed. For example, a single test pattern in which patterns having contrast exist at the center location and eight adjacent locations such as the upper, lower, left, right, upper left, upper right, lower left, and lower right locations as shown in FIG. 8D is prepared. Then, according to the configuration, one of the center, upper, lower, left, right, upper left, upper right, lower left, and lower right locations is determined to be a location that the focus detection unit 123 captures using TV AF. Alternatively, focus may be adjusted in advance so as to be set at a plurality of locations in sequence, and the focus lens driving amount for respective locations may be stored, and the lens driving amount that allows focus to be set at an appropriate location according to the configuration is read, and the read amount may be applied.

Although an example in which focus of each projection image is set close to the center of the entire picture plane at the time of multi-projection has been described, this is because typically the center portion of the image is the most important. Accordingly, for the purpose in which a location other than the center of the picture plane is more important, it can also be considered to focus at a position other than the center position. Assume a case in which, for example, an image to be projected is made up of a plurality of window images, and it is obvious that the most important window image is displayed on the left side. In this case, it is sufficient to make a change such that each projector displays a test pattern so as to allow focus to be set closer to the location on the left side, and the test pattern is captured by the focus detection unit 123.

In the present embodiment, by distinguishing the configuration of the projection system in advance, the focus position of each projector can be changed when performing multi-projection, on the basis of the entire picture plane of multi-projection. In this way, adjustment can be performed so as to focus at, for example, the center position of the picture plane, which can be considered as being most important in the image, and thus a more appropriate multi-projection image can be obtained.

Second Embodiment

Figure 11:
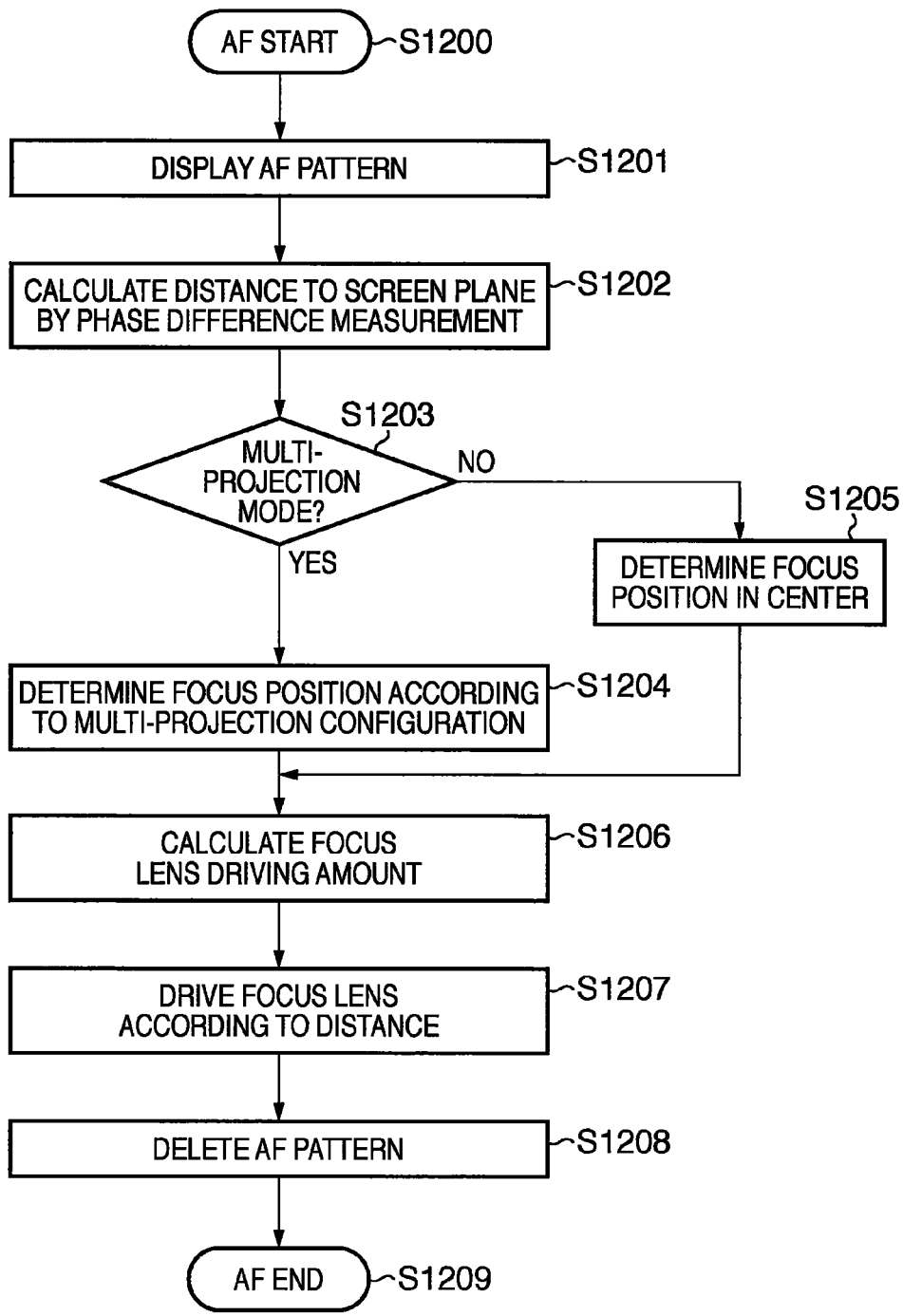
FIG. 11 is a flowchart of an autofocus operation in a second embodiment.

The flow shown in FIG. 10 may be changed to that as shown in FIG. 11. In the flow shown in FIG. 11, the distance to the screen is measured based on phase difference measurement.

In the case of using a phase difference, the focus detection unit 123 is provided with two image sensors disposed at spatially different positions. First, a test pattern having contrast as shown in FIG. 8A is projected, and the two image sensors of the focus detection unit 123 capture the test pattern. Here, a phase difference can be obtained based on images output by the two image sensors. Since this phase difference changes according to the distance between the test pattern and the main body, the distance can be obtained based on the phase difference. If the optimal focus lens driving amount according to the distance is measured in advance, the optical system control unit 109 controls the focus lens according to that driving amount, and thereby focus can be adjusted so as to be at a desired position on the screen. Specifically, autofocus for focusing at a desired picture plane position can be realized.

The control unit 101 controls the units in accordance with the flow shown in FIG. 11. In step S1200, the flow of autofocus starts.

In step S1201, a test pattern for phase difference measurement is displayed. An example is a test pattern as shown in FIG. 8A.

In step S1202, a phase difference is obtained with respect to the test pattern displayed in step S1201 as described above, and the distance is calculated.

In step S1203, it is determined whether or not the configuration of the projection system is multi-projection. Control shifts to step S1204 if it is multi-projection, and control shifts to step S1205 if it is not.

In step S1204, a focus position according to the multi-projection configuration is determined. An example of a method for determining an appropriate focus position is a method of selecting one of the positions A to I in FIG. 9 as a position close to the center in a multi-picture plane, as in the first embodiment.

In step S1205, since single projection or stack projection is performed, a focus position is set in the center portion, which is an appropriate position.

In step S1206, the focus lens driving amount is calculated based on the distance calculated in step S1202 and the position determined in step S1204 or step S1205.

Now, a method for calculating the focus lens driving amount is specifically described. In the present embodiment, a table shown in FIG. 12 is prepared by creating it in advance by measurement in an experiment or the like, with respect to focus positions corresponding to the positions A to I in FIG. 9. This table shows the focus lens driving amount with which focus is set at each focus position in the following four patterns. Specifically, the patterns are as follows:

(1) when the distance obtained based on a phase difference is 1.0 m, and the zoom lens is at the telephoto end;

(2) when the distance obtained based on a phase difference is 1.0 m, and the zoom lens is at the wide angle end;

(3) when the distance obtained based on a phase difference is infinity, and the zoom lens is at the telephoto end; and (4) when the distance obtained based on a phase difference is infinity, and the zoom lens is at the wide angle end.

Based on the actual distance, the amount of optical zooming and the focus position, a close value is obtained from A1 to A4 . . . I1 to I4 in the table shown in FIG. 12. Then, the amount of controlling of the projection optical system 107, specifically, the focus lens driving amount can be obtained by performing interpolation processing (for example, linear interpolation).

In step S1207, the focus lens is driven in accordance with the driving amount obtained in step S1206. Accordingly, focus can be set at the position determined in step S1204 or step S1205.

In step S1208, the AF pattern displayed in step S1201 is deleted, and the display returns to the display of original video.

In step S1209, the flow of autofocus ends.

In the second embodiment as described above, appropriate focus adjustment can be implemented by calculating the focus lens driving amount according to the configuration or conditions with respect to the distance obtained using a predetermined method.

In the present embodiment as well, by distinguishing the configuration of the projection system in advance, a focus position can be changed on the basis of the entire multi-projection picture plane when performing multi-projection. In this way, for example, adjustment can be performed so as to focus at the center position of the picture plane, which can be considered as being most important in the image, and thus a more appropriate multi-projection image can be obtained.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-085234, filed on Apr. 1, 2010, which is hereby incorporated by reference herein in its entirety.

What is claimed is:

1. A projection system comprising a first projection apparatus and second projection apparatus,
the first projection apparatus including:
a first projection unit configured to project an image onto a projection plane; and
a first optical control unit configured to control an optical system such that an image, that is positioned at a designated first specific position of the image projected by the first projection unit, is sharply displayed on the projection plane,
the second projection apparatus including:
a second projection unit configured to project an image onto a projection plane; and
a second optical control unit configured to control an optical system such that an image, that is positioned at a designated second specific position of the image projected by the second projection unit, is sharply displayed on the projection plane, and
the projection system comprising a control unit configured, if projection is performed in which a projection image projected by the first projection unit and a projection image projected by the second projection unit each form a part of one image, to control the first optical control unit so as to cause the first specific position to be closer to the projection image projected by the second projection unit relative to the center of the projection image projected by the first projection unit, and to control the second optical control unit so as to cause the second specific position to be closer to the projection image projected by the first projection unit relative to the center of the projection image projected by the second projection unit.

2. The projection system according to claim 1, wherein the control unit determines whether or not a current mode is a mode for projection in which the projection image projected by the first projection unit and the projection image projected by the second projection unit form one image.

3. The projection system according to claim 1, wherein:
the first optical control unit controls the optical system based on a first specific pattern image projected onto the projection plane by the first projection unit,
the second optical control unit controls the optical system based on a second specific pattern image projected onto the projection plane by the second projection unit, and
if projection is performed in which the projection image projected by the first projection unit and the projection image projected by the second projection unit each form a part of one image, the control unit:
controls the first projection unit so as to cause a display position of the first specific pattern image to be closer to the projection image projected by the second projection unit relative to the center of the projection image projected by the first projection unit, and
controls the second projection unit so as to cause a position of the second specific pattern image to be closer to the projection image projected by the first projection unit relative to the center of the projection image projected by the second projection unit.

4. A control method for a projection system comprising (i) a first projection apparatus including a first projection unit configured to project an image onto a projection plane and a first optical control unit configured to control an optical system such that an image, that is positioned at a designated first specific position of the image projected by the first projection unit, is sharply displayed on the projection plane, and (ii) a second projection apparatus including a second projection unit configured to project an image onto a projection plane and a second optical control unit configured to control an optical system such that an image, that is positioned at a designated second specific position of the image projected by the second projection unit, is sharply displayed on the projection plane, the method comprising:
a step of, if projection is performed in which a projection image projected by the first projection unit and the projection image projected by the second projection unit each form a part of one image,
controlling the first optical control unit so as to cause the first specific position to be closer to the projection image projected by the second projection unit relative to the center of the projection image projected by the first projection unit, and
controlling the second optical control unit so as to cause the second specific position to be closer to the projection image projected by the first projection unit relative to the center of the projection image projected by the second projection unit.

5. A projection apparatus for projecting an image onto a projection plane, comprising:
a projection unit configured to project an image onto a projection plane;
an optical control unit configured to control an optical system such that an image, that is positioned at a designated specific position of the image projected by the projection unit, is sharply displayed on the projection plane; and
a control unit configured to change the specific position depending on whether projection in which a projection image projected by another projection apparatus and the projection image projected by the projection unit each form a part of one image is performed or whether projection in which the projection unit forms one image is performed,
wherein in a case where projection is performed in which a projection image projected by the other projection apparatus and the projection image projected by the projection unit each form a part of one image, the control unit controls the optical control unit so as to cause the specific position to be closer to the projection image projected by the other projection apparatus relative to the center of the projection image projected by the projection unit.

6. The projection apparatus according to claim 5, wherein the optical control unit controls the optical system based on a specific pattern image projected onto the projection plane by the projection unit, and wherein in a case where the projection is performed in which a projection image projected by the other projection apparatus and the projection image projected by the projection unit each form a part of one image, the control unit controls the projection unit so as to cause a position of the specific pattern image to be closer to the projection image projected by the other projection apparatus relative to the center of the projection image projected by the projection unit.

7. The projection apparatus according to claim 5,
wherein the optical control unit controls the optical system based on a distance between the projection plane and the projection apparatus.

8. A projection apparatus for projecting an image onto a projection plane, comprising:
a projection unit configured to project an image onto a projection plane;
an optical control unit configured to control an optical system such that an image, that is positioned at a designated specific position of the image projected by the projection unit, is sharply displayed on the projection plane; and
a control unit configured to change the specific position depending on whether projection in which a projection image projected by another projection apparatus and the projection image projected by the projection unit each form a part of one image is performed or whether projection in which the projection unit forms one image is performed,
wherein in a case where projection is performed in which a projection image projected by the other projection apparatus and the projection image projected by the projection unit each form a part of one image, the control unit controls the optical control unit so as to cause the specific position to be closer to a join in the one image.

9. The projection apparatus according to claim 8,
wherein the optical control unit controls the optical system based on a specific pattern image projected onto the projection plane by the projection unit, and
wherein in a case where projection is performed in which a projection image projected by the other projection apparatus and the projection image projected by the projection unit each form a part of one image, the control unit controls the projection unit so as to cause a position of the specific pattern image to be closer to the join in the one image.

10. The projection apparatus according to claim 8,
wherein the optical control unit controls the optical system based on a distance between the projection plane and the projection apparatus.

11. A projection system comprising a first projection apparatus and a second projection apparatus,
the first projection apparatus including:
a first projection unit configured to project an image onto a projection plane; and
a first optical control unit configured to control an optical system to focus an image, that is positioned at a designated first specific position of the image projected by the first projection unit, on the projection plane,
the second projection apparatus including:
a second projection unit configured to project an image onto a projection plane; and
a second optical control unit configured to control an optical system to focus an image, that is positioned at a designated second specific position of the image projected by the second projection unit, on the projection plane, and the projection system comprising a control unit configured, if projection is performed in which a projection image projected by the first projection unit and a projection image projected by the second projection unit each form a part of one image, to control the first optical control unit so as to cause the first specific position to be closer to the projection image projected by the second projection unit relative to the center of the projection image projected by the first projection unit, and to control the second optical control unit so as to cause the second specific position to be closer to the projection image projected by the first projection unit relative to the center of the projection image projected by the second projection unit.

12. The projection system according to claim 11,
wherein the control unit determines whether or not a current mode is a mode for projection in which the projection image projected by the first projection unit and the projection image projected by the second projection unit form one image.

13. The projection system according to claim 11, wherein,
the first optical control unit controls the optical system based on a first specific pattern image projected onto the projection plane by the first projection unit,
the second optical control unit controls the optical system based on a second specific pattern image projected onto the projection plane by the second projection unit, and
if projection is performed in which the projection image projected by the first projection unit and the projection image projected by the second projection unit each form a part of one image, the control unit:
controls the first projection unit so as to cause a display position of the first specific pattern image to be closer to the projection image projected by the second projection unit relative to the center of the projection image projected by the first projection unit, and
controls the second projection unit so as to cause a position of the second specific pattern image to be closer to the projection image projected by the first projection unit relative to the center of the projection image projected by the second projection unit.

14. A control method for a projection system comprising (i) a first projection apparatus including a first projection unit configured to project an image onto a projection plane and a first optical control unit configured to control an optical system to focus an image, that is positioned at a designated first specific position of the image projected by the first projection unit, on the projection plane, and (ii) a second projection apparatus including a second projection unit configured to project an image onto a projection plane and a second optical control unit configured to control an optical system to focus an image, that is positioned at a designated second specific position of the image projected by the second projection unit, on the projection plane, the method comprising:
a step of, if projection is performed in which a projection image projected by the first projection unit and the projection image projected by the second projection unit each form a part of one image,
controlling the first optical control unit so as to cause the first specific position to be closer to the projection image projected by the second projection unit relative to the center of the projection image projected by the first projection unit, and
controlling the second optical control unit so as to cause the second specific position to be closer to the projection image projected by the first projection unit relative to the center of the projection image projected by the second projection unit.

\* \* \* \* \*